United States Patent [19]

Farnworth et al.

[11] Patent Number: 5,021,280
[45] Date of Patent: Jun. 4, 1991

[54] WATERPROOF SWEAT-TRANSMITTING CLOTHING INSULATION

[75] Inventors: Brian Farnworth, Kinburn; Rita M. Crow, Stittsville, both of Canada

[73] Assignee: Her Majesty the Queen in right of Canada, as represented by the Minister of National Defence, Ottawa, Canada

[21] Appl. No.: 403,340

[22] Filed: Sep. 6, 1989

[30] Foreign Application Priority Data

Dec. 9, 1988 [CA] Canada ................................ 585533

[51] Int. Cl.$^5$ .............................................. B32B 3/06
[52] U.S. Cl. ..................................... 428/102; 112/402; 112/420; 428/246; 428/252; 428/253; 428/314.4; 428/314.8; 428/920
[58] Field of Search .............. 428/102, 246, 252, 253, 428/300, 920, 314.4, 314.8; 112/402, 420

[56] References Cited

U.S. PATENT DOCUMENTS

| | | | |
|---|---|---|---|
| 4,469,740 | 9/1984 | Bailly | 428/300 |
| 4,530,873 | 7/1985 | Okada | 428/253 |
| 4,608,298 | 8/1986 | Klaff | 428/102 |

*Primary Examiner*—James J. Bell
*Attorney, Agent, or Firm*—William R. Hinds

[57] ABSTRACT

The invention relates to a composite fabric which will provide insulating properties in the presence of water and which will also permit the passage of perspiration therethrough. The fabric includes a first layer of a water-impermeable insulating material, two layers of a wicking fabric, such layers being positioned adjacent the inner and outer surfaces of the first layer, and a plurality of wicking threads passing through the first layer and securing the wicking fabric layers to the first layer. The insulating layer helps prevent water from reaching the wearer. Perspiration from the wearer is picked up by the inner wicking layer and transferred by capillary action through the threads to the outer wicking layer from which it can evaporate to the atmosphere. If desired the outer wicking layer can be covered by a liquid-water impermeable but water-vapor permeable material.

15 Claims, 1 Drawing Sheet

WATERPROOF SWEAT-TRANSMITTING CLOTHING INSULATION

The present invention relates to protective or insulative fabrics for use in cold weather or in damp or immersion situations particularly where the wearer is liable to perspire as he works or moves about.

BACKGROUND OF THE INVENTION

Insulating clothing is worn by both civilian and military personnel in many situations in which such personnel are exposed to cold and/or wet conditions. Suits and boots lined with insulating material might be used by land, air or naval personnel in any number of situations requiring warmth and/or protection from the elements, including water. As such individuals go about their tasks it is not unusual for them to perspire, perhaps heavily, and it becomes very desirable to remove such perspiration as quickly and completely as possible for the health and comfort of the individuals. This is particularly true when such individuals are working in the presence of water.

Insulation in the form of closed-cell foam materials maintains its insulating properties when immersed since water cannot penetrate into the cells of the foam material, which remain full of air. However, such materials do not permit the passage of perspiration from one side of the foam to the other. Alternatively, a composite can be made from vapour-permeable insulation such as battings, down and feathers, pile, or woven textile fabrics and then made essentially waterproof by being encased in an outer shell of a liquid-water impermeable, but water-vapour permeable fabric. Such a composite can fail if the seams of the encasing fabric fail or leak or if the encasing fabric deteriorates with age or contamination by oils, dirt, detergents or chemicals, etc. Once the outer shell leaks the insulating layer becomes wet and useless. Garments incorporating this type of composite also fail on immersion if water enters through closures at the neck, cuffs or ankles.

SUMMARY OF THE INVENTION

As can be seen from the above there is a need for a fabric from which garments or boots can be made, which material provides warmth through insulation, is impermeable to water (particularly under immersion conditions) and which will allow for the escape of perspiration when the garments or boots are not immersed in water. This need is met by the present invention.

The present invention overcomes the problems of the prior art by providing a composite insulating laminate comprising a layer of water-impermeable insulating material having inner and outer surfaces, a thin first layer of a wicking material adjacent the inner surface, a thin second layer of a wicking material adjacent the outer surface, and a plurality of thread means of a wicking material extending through the insulating material and connecting the first layer of wicking material to the second layer of wicking material, whereby moisture absorbed by the first layer of wicking material can advance through the insulating material via the thread means to the second layer of wicking material for evaporation therefrom.

In one particular embodiment the insulating material can be a closed-cell foam material such as neoprene or polyethylene which retains its insulating properties on immersion in water. On each side of the foam layer is a layer of fabric with good wetting and wicking properties. The fabric can be knitted or woven although a knitted fabric is preferred as the resulting composite is more flexible. The two fabric layers and the foam layer are sewn together with a thread which also has wicking properties. Conventional sewing threads of cotton and/or spun polyester are quite suitable. The resulting composite can be covered by a protective outer fabric which is impermeable to liquid water but which is permeable to water vapour.

The composite of the present invention will stop the passage of liquid water from the exterior thereof due to the impermeability of the outer fabric layer. However, perspiration from the wearer will be picked up by the inner wicking layer and when that layer (or a portion thereof) becomes saturated the perspiration will pass by capillary action along the wicking threads, through the insulating material, to the outer wicking layer from which it can evaporate, either directly or through the outer protective layer if provided.

Additional advantages and features of the present invention will be described with reference to the drawings.

DESCRIPTION OF THE PREFERRED EMBODIMENT

Figure 1:
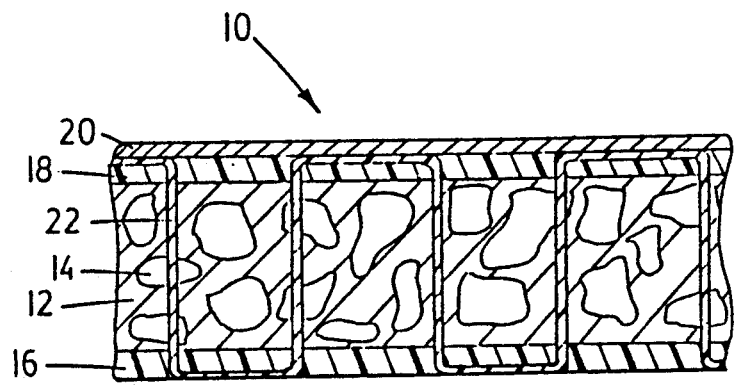
FIG. 1 is a cross-section, on an enlarged scale, of a composite fabric constructed in accordance with this invention.

FIG. 1 illustrates a preferred form 10 of the composite fabric of the present invention. In this case thermal insulation is provided by a layer 12 of foam material having cells 14 of air entrapped therein. Layer 12 will typically be a commercially available closed-cell material such as neoprene or polyethylene, which material is impermeable to water and maintains its insulating properties on immersion in water. Layer 12 will usually be provided in a thickness of 3 to 10 mm.

On the inner surface of the layer 12 there is provided a first layer 16 of a fabric having good wetting and wicking properties. Although knitted or woven fabrics are suitable, a knitted fabric is preferred for better flexibility. The fabric 16 will have a surface tension similar to water and will preferably be a continuous filament fabric so that a drop of water placed thereon will easily and quickly wet the fabric and spread by capillary action in the interyarn and interfibre spaces to cover a large area of the fabric.

On the outer surface of the layer 12 there is provided a second layer 18 of a fabric the same as the layer 16. The layers 16, 18 are connected to the foam layer 12 and to each other by threads 22 which also have wicking properties. Suitable threads would be conventional commercially available sewing threads of cotton and/or spun polyester. Lines of stitches about 1 cm apart and with about 5 stitches per centimeter are sufficient to achieve the desired results of this invention.

Depending on the end use of the composite fabric of this invention it might be desirable to also provide a layer 20 of a liquid-water impermeable but water-vapour permeable material adjacent the outer layer 18. A suitable material for layer 20 would be one of the fabrics available under the trade marks, DERMO- FLEX, STEDTHANE, GORETEX, CLIMATE or ENTRANT. The layer 20 may be attached by conventional fabric laminating techniques such as gluing, melting or fusible interlinings.

Assuming that the fabric of the invention is made into boots or a suit the fabric will provide thermal insulation during immersion in water due to the foam layer 12. In wear outside immersion conditions perspiration will be transferred from the skin to the first layer 16 of wicking material, either by direct contact or by evaporation from the skin and condensation on the layer 16. The liquid water spreads through layer 16 by capillary action and is brought into contact with the threads 22. When the concentration of water in the layer 16 is sufficiently large (about 30-100% of the weight of dry fabric when the small pores of the fabric are filled) liquid transport to the threads will occur and then liquid transport through the foam layer 12 via the threads to the outer layer 18 will occur. The liquid water will then spread through layer 18 and it will evaporate therefrom, either directly or through protective layer 20, to the atmosphere.

If utilized, the layer 20 will render the fabric 10 protective against rain or brief immersion in water. Full waterproofness against prolonged immersion for garments made from the material of this invention depends on the utilization of appropriate closures.

The ability to pass water from perspiration or sweat is demonstrated by experiments performed on a sweating hot plate. A sample composite fabric in accordance with the invention was constructed from a polyester taffeta fabric (140 g/m$^2$) for layers 16 and 18, a neoprene closed-cell foam 3 mm thick for layer 12 and a nylon woven fabric (115 g/m$^2$) coated with STEDTHANE (30 g/m$^2$) for layer 20. The composite fabric was placed on the hot plate directly, and without intervening air layers. The heat loss from the plate was monitored during and after a 1 hour period of simulated sweat at a rate of 0.1 g/m$^2$s. The plate temperature was maintained at 35° C. Atmospheric conditions were 20° C. and 30% relative humidity. The sample was weighed before and after the experiment.

Figure 2:
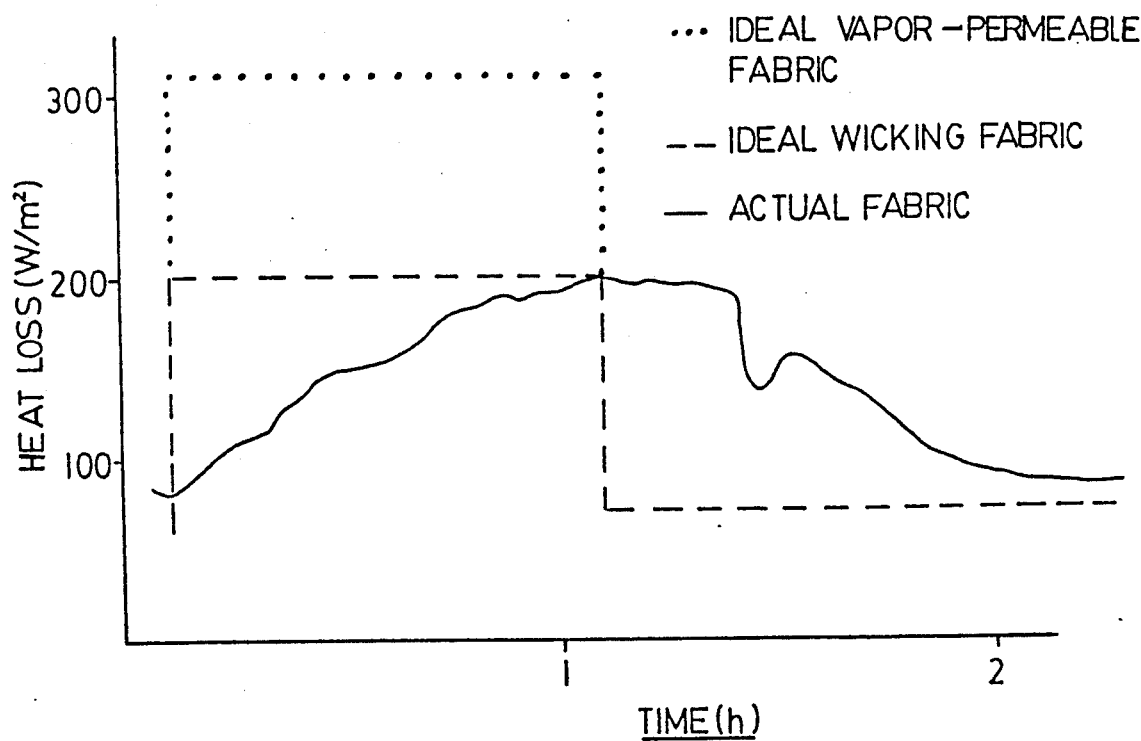
FIG. 2 is a graph showing heat loss through a composite fabric of this invention before, during and after a period of heavy perspiration.

FIG. 2 shows the experimental results along with the ideal curves. The dotted curve is that which would be expected from a perfectly vapour-permeable fabric. The heat loss during the sweating period would be the heat loss in the absence of sweat (about 75 W/m$^2$) plus the heat required to evaporate 0.1 g/m$^2$s of water (about 250 W/m$^2$) if the evaporation were to take place from the plate surface. The dashed curve is the heat loss which would be expected if the wicking mechanism were to work perfectly. If the water were to be wicked rapidly and immediately to the outside surface of the foam and then evaporated the increase in heat loss would be expected to be about half that of evaporation from the plate (125 W/m$^2$).

The solid curve of FIG. 2 is the result of the experiment itself. The heat loss does rise to the expected level but it takes almost one hour to do so. This delay time may be attributed to the necessity of feeding in a finite amount of water to wet layer 16 before wicking through the threads 22 can reach its full rate. After the sweating stops the heat loss remains high until all excess water on the inside has wicked out and then gradually drops. At the end of the experiment, one hour after the cessation of sweating, weighing indicated that 30 g/m$^2$ of water remained in the fabric. This is about 8% of the total sweat emitted during the one hour sweating period.

It is clear from the experiment that sweat is indeed removed from the inside of the composite fabric by wicking.

The composite fabric of the present invention can be used to make garments, including boots and suits, for use in inclement weather, when insulation is required and when the wearer will be creating perspiration through exertion. A multitude of occasions arise in which clothing made from the composite fabric of this invention would be desirable, including situations ranging from labour-intensive activities through high-exertion sporting activities. The description herein relates to two basic embodiments of the invention but, undoubtedly, someone skilled in the art could develop other fabric constructions without departing from the spirit of the invention. Thus the scope of protection to be afforded this invention is to be determined from the claims appended hereto.

The embodiments of the invention in which an exclusive property or privilege is claimed are defined as follows:

1. A composite insulating garment laminate comprising a layer of water-impermeable insulating material having inner and outer surfaces, a thin first layer of a wicking fabric on said inner surface, a thin second layer of a wicking fabric on said outer surface, and sewing thread means of a wicking material extending through said insulating material in a conventional stitching pattern and connecting said first layer of wicking fabric to said second layer of wicking fabric, whereby moisture absorbed by said first layer of wicking fabric can advance through said insulating material via said thread means to said second layer of wicking fabric for evaporation therefrom.

2. The laminate of claim 1 wherein said insulating material is a closed-cell foam insulating material.

3. The laminate of claim 2 wherein each of said first and second layers of wicking fabric is a knitted fabric.

4. The laminate of claim 2 wherein each of said first and second layers of wicking fabric is a woven fabric.

5. The laminate of claim 3 wherein said thread means includes conventional sewing threads of cotton and/or spun polyester extending through said insulating material in a conventional stitching pattern to connect said first and second layers of wicking fabric together.

6. The laminate of claim 5 wherein said stitching pattern comprises a plurality of straight lines of stitches of about five stitches per centimeter and about 1 centimeter between adjacent lines of stitches.

7. The laminate of claim 4 wherein said thread means includes conventional sewing threads of cotton and/or spun polyester extending through said insulating material in a conventional stitching pattern to connect said first and second layers of wicking fabric together.

8. The laminate of claim 7 wherein said stitching pattern comprises a plurality of straight lines of stitches of about five stitches per centimeter and about 1 centimeter between adjacent lines of stitches.

9. The laminate of claim 1, including an outermost protective layer of a water-vapour permeable but water impermeable material secured to said second layer of wicking fabric, permitting the evaporation of moisture therethrough from said second layer but prohibiting the passage of water therethrough towards said laminate.

10. The laminate of claim 5, including an outermost protective layer of a water-vapour permeable but water impermeable material secured to said second layer of wicking fabric, permitting the evaporation of moisture therethrough from said second layer but prohibiting the passage of water therethrough towards said laminate.

11. The laminate of claim 7, including an outermost protective layer of a water-vapour permeable but water impermeable material secured to said second layer of wicking fabric, permitting the evaporation of moisture therethrough from said second layer but prohibiting the passage of water therethrough towards said laminate.

12. A composite insulating laminate consisting essentially of a layer of water-impermeable insulating material having inner and outer surfaces, a thin first layer of a wicking material adjacent said inner surface, a thin second layer of a wicking material adjacent said outer surface, and a plurality of thread means of a wicking material extending through said insulating material and said first and second layers in a conventional stitching pattern and connecting said first layer of wicking material to said second layer of wicking material, whereby moisture absorbed by said first layer of wicking material can advance through said insulating material via said thread means to said second layer of wicking material for evaporation therefrom.

13. A composite insulating laminate consisting essentially of a layer of water-impermeable insulating material having inner and outer surfaces, a thin first layer of a wicking material adjacent said inner surface, a thin second layer of a wicking material adjacent said outer surface, and a plurality of thread means of a wicking material extending through said insulating material and connecting said first layer of wicking material to said second layer of wicking material, whereby moisture absorbed by said first layer of wicking material can advance through said insulating material via said thread means to said second layer of wicking material for evaporation therefrom, and an outermost protective layer of a water-vapor permeable but water impermeable material secured to said second layer of wicking material, permitting the evaporation of moisture therethrough from said second layer but prohibiting the passage of water therethrough toward said laminate, said thread means extending only through said insulating material and said first and second layers of wicking material such that said outermost protective layer is secured other than by said thread means.

14. A composite insulating laminate as claimed in claim 12 wherein said insulating material consists essentially of a single thickness of water-impermeable, closed cell foam of thickness between about 3 mm and 10 mm, and each said layer of wicking material is a wicking fabric of knitted or woven construction.

15. A composite insulating laminate as claimed in claim 13 wherein said insulating material consists essentially of a single thickness of water-impermeable, closed cell foam of thickness between about 3 mm and 10 mm, and each said layer of wicking material is a wicking fabric of knitted or woven construction.

* * * * *